United States Patent [19]

Olstowski

[11] 4,122,058

[45] Oct. 24, 1978

[54] RAPID-SETTING POLYURETHANES PREPARED IN THE PRESENCE OF A CYCLIC UNSATURATED ALIPHATIC HYDROCARBON

[75] Inventor: Franciszek Olstowski, Freeport, Tex.

[73] Assignee: The Dow Chemical Company, Midland, Mich.

[21] Appl. No.: 850,887

[22] Filed: Nov. 14, 1977

Related U.S. Application Data

[63] Continuation-in-part of Ser. No. 768,134, Feb. 14, 1977, abandoned.

[51] Int. Cl.$^2$ .................. C08G 18/02; C08K 5/01
[52] U.S. Cl. .................. 260/33.6 UB; 264/337; 528/48; 528/55; 528/58

[58] Field of Search ......... B29C/1/02; 260/33.6 UB, 260/77.5 R

[56] References Cited

U.S. PATENT DOCUMENTS

| | | | |
|---|---|---|---|
| 3,714,110 | 1/1973 | Verdol et al. | 260/33.6 UB |
| 3,801,532 | 4/1974 | Olstowski | 260/33.6 UB |
| 3,878,157 | 4/1975 | Olstowski et al. | 260/33.6 UB |
| 3,879,329 | 4/1975 | Olstowski et al. | 260/33.6 UB |

*Primary Examiner*—H.S. Cockeram
*Attorney, Agent, or Firm*—J. G. Carter

[57] ABSTRACT

Rapid-setting polyurethanes are prepared employing as the modifier component therein a cyclic unsaturated aliphatic hydrocarbon having an atmospheric boiling point above about 140° C such as dicyclopentadiene.

8 Claims, No Drawings

RAPID-SETTING POLYURETHANES PREPARED IN THE PRESENCE OF A CYCLIC UNSATURATED ALIPHATIC HYDROCARBON

CROSS-REFERENCE TO RELATED APPLICATION

This application is a continuation-in-part of application Ser. No. 768,134, filed Feb. 14, 1977, and now abandoned.

This invention relates to rapid-setting polyurethanes and, more particularly, to rapid-setting polyurethanes containing cyclic unsaturated aliphatic hydrocarbons and a process for their preparation.

Rapid-setting rigid polyurethanes are well known in the art, such as those described in U.S. Pat. Nos. 3,375,511; 3,726,827; 3,746,692; 3,966,662 and 3,933,705.

U.S. Pat. No. 3,933,705 discloses that aliphatic hydrocarbons are incompatible with and are rejected by the rapid-setting urethane-forming systems and that such hydrocarbons are rendered useful by employing with the aliphatic hydrocarbons fatty acids and fatty oils.

It has now been unexpectedly discovered that cyclic unsaturated aliphatic hydrocarbons are not incompatible with nor are they rejected by the urethane-forming system thereby making them useful as the modifier component in rapid-setting polyurethanes without the need for a compatibilizing agent such as a fatty acid or fatty oil.

The present invention is therefore directed to solid, rigid, non-cellular polyurethanes having a density of at least about 1 g/cc, resulting from the admixture of the components of a polyurethane-forming composition, which can be demolded within 5 minutes, said polyurethane-forming composition comprising (A) a polyol or mixture of polyols having a functionality of from 2 to about 8 and an average hydroxyl equivalent weight of from about 30 to less than about 250, preferably from about 75 to about 200;

(B) an organic polyisocyanate;

(C) a liquid cyclic unsaturated aliphatic hydrocarbon having a boiling point of at least about 140° C. preferably at least about 150° C.; and (D) a non-amine containing catalyst for urethane formation;

wherein Components (A) and (B) are present in quantities so as to provide an NCO:OH ratio of from about 0.8:1 to about 2:1, preferably from about 0.95:1 to about 1.1:1; Component (C) is present in quantities of from about 15 to about 50 and preferably from about 20 to about 40 percent by weight of the sum of the weights of Components (A), (B) and (C); with the proviso that when Component (A) is an amine initiated polyol, the quantity of Component (D) may be zero and when Component (A) is a difunctional polyol, then the average NCO-functionality of Component (B) is at least about 2.5.

The compositions of the present invention do not contain a catalyst or initiator for polymerization of the unsaturated groups of the modifier compounds employed herein.

By the term "rigid" or non-elastomeric as used herein, it is meant that the compositions which when solidified or set have percent elongation values at the break point of less than 100 percent.

By the term "solid" as used herein, it is meant that the compositions when solidified or set have densities of at least about 1 gram per cubic centimeter.

By the term "non-cellular" as used herein, it is meant that the compositions are not foams, i.e., they are essentially void of gas-filled cells.

Suitable polyols for use in the present invention are those known to be useful in the preparation of rapid-setting polyurethanes having 2–8 hydroxyl groups and an average equivalent weight of from about 75 to about 230 as taught and described in U.S. Pat. Nos. 3,726,827; 3,746,692; 3,801,532; 3,966,662 and 3,933,705.

Suitable dihydroxyl-containing compounds having an average OH equivalent weight below about 250 which are employed as Component (A) also include, for example, ethylene glycol, propylene glycol, butylene glycol, pentanediol, hexanediol, diethylene glycol, dipropylene glycol, bisphenol A, resorcinol, catechol, hydroquinone, mixtures thereof, adducts of a dihydroxyl-containing compound and a vicinal epoxy compound such as, for example, ethylene oxide, 1,2-propylene oxide, 1,2-butylene oxide, styrene oxide, epichlorohydrin, epibromohydrin, mixtures thereof and the like. When the dihydoxyl containing compound is a solid it is suitably employed by dissolving it in a suitable solvent such as, for example, a liquid polyol, tri-n-butyl phosphate, triethyl phosphate or the like.

Suitable amine initiated polyols which are employed as Component (A) in the present invention include, for example, those prepared by reacting an alkylene oxide with an amine having from 3 to about 8 active hydrogen atoms.

Suitable amines include, for example, ammonia, ethylenediamine, 1,3-diaminopropane, 1,4-diaminobutane, 1,5-diaminopropane, 1,6-diaminohexane, diethylenetriamine, triethylenetetramine, tetraethylenepentamine, pentaethylenehexamine, aminoethyl ethanolamine, mixtures thereof and the like.

Suitable alkylene oxides include, for example, ethylene oxide, 1,2-propylene oxide, 1,2-butylene oxide, 2,3-butylene oxide, styrene oxide, epichlorohydrin, epibromohydrin, epiiodohydrin, mixtures thereof and the like.

Suitable initiator compounds having from 3 to 8 hydroxyl groups which are employed to prepare polyols (Component A) employed in the present invention include, for example, glycerine, trimethylolpropane, pentaerythritol, sorbitol, sucrose, mixtures thereof and the like.

Suitable vicinal epoxy compounds which may be reacted with the initiator compounds to prepare polyols employed as Component A in the present invention include, for example, the lower alkylene oxides and substituted alkylene oxides such as ethylene oxide, 1,2-propylene oxide, 1,2-butylene oxide, 2,3-butylene oxide, epichlorohydrin, epibromohydrin, epiiodohydrin, styrene oxide, mixtures thereof and the like.

Suitable polyisocyanates and catalysts which are useful in the present invention are also described in the above mentioned patents.

Suitable organic polyisocyanates which may be employed as Component (B) in the present invention include, for example, any organic polyisocyanate having 2 or more NCO groups per molecule and no other substituents capable of reacting with the hydroxyl groups of the polyether polyols employed as Component (A). Suitable such polyisocyanates include, for example, 2,4-toluenediisocyanate, 2,6-toluenediisocyanate, hexamethylene diisocyanate, p,p'-diphenylmethanediisocyanate, p-phenylenediisocyanate (e.g., Hylene W) naphthalene diisocyanate, dianisidine diisocyanate, polymethylene polyphenylisocyanate, mixtures of one or more polyisocyanates and the like.

Other organic isocyanates which are suitably employed and which are to be included in the term organic polyisocyanate include isocyanate terminated prepolymers prepared from the previously mentioned polyols and the above mentioned isocyanates.

Suitable organic polyisocyanates which may be employed as Component (B) in the polyurethane compositions of the present invention when Component (A) has a functionality of 2 include those having an average NCO functionality of at least about 2.5 such as, for example, the polymethylene polyphenyl isocyanates, NCO-containing prepolymers such as the reaction products of an excess of an organic diisocyanate with polyhydroxyl containing compounds having from 3 to about 8 OH groups per molecule such as, for example, glycerine, trimethylolpropane, pentaerythritol, sorbitol, sucrose, mixtures thereof and mixtures with dihydroxyl-containing compounds such that the average hydroxyl functionality of the mixture is at least about 2.5. It is preferred that the organic polyisocyanate be liquid; however, in the event that it is a solid or semi-solid or of a relatively high viscosity such that blending with the other components would be difficult or inconvenient, they may be prepared in a suitable solvent such as, for example, trichlorobenzene, propylene carbonate and the like.

Suitable organic diisocyanates which are employed in the preparation of the prepolymers containing an average of at least 2.5 NCO groups include for example, 2,4-toluene diisocyanate, 2,6-toluenediisocyanate, hexamethylene diisocyanate, p,p'-diphenylmethanediisocyanate, p-phenylenediisocyanate (e.g., Hylene ® W) naphthalene diisocyanate, dianisidine diisocyanate, mixtures of one or more polyisocyanates and the like.

The prepolymers employed as the polyisocyanate, Component (B), in the present invention have a percent NCO content of from about 8 to about 40 and preferably from about 12 to about 32 percent by weight.

Suitable organo-metal catalysts for urethane formation include, for example, organo-metal compounds of tin, zinc, lead, mercury, cadmium, bismuth, cobalt, antimony, iron and the like such as, for example, metal salts of a carboxylic acid having from about 2 to about 20 carbon atoms including, for example, stannous octoate, dibutyltin dilaurate, dibutyltin diacetate, ferric acetyl acetonate, lead octoate, lead oleate, phenylmercuric propionate, cobalt naphthenate, lead naphthenate, mixtures thereof and the like.

It is preferred that the catalysts be employed in liquid form. Those catalysts which are not ordinarily liquids are preferably added as a solution in a solvent. Suitable such solvents include, for example, dioctylphthalate, polyoxyalkylene glycols, mineral spirits, dipropylene glycol, mixtures thereof and the like.

So much of the previously mentioned U.S. patents as pertains to suitable polyols, polyisocyanates, catalysts and their relationship as to function and quantity to prepare rapid-setting polyurethanes are incorporated herein by reference.

As described in one or more of the previously mentioned patents when the polyol is an amine-initiated polyol, a catalyst is not required although such may be employed if desired and when a polyol having a functionality of 2 is employed, the polyisocyanate employed has an average functionality of at least about 2.5.

Suitable liquid cyclic unsaturated aliphatic hydrocarbons include, for example, dicyclopentadiene, the dimer of methylcyclopentadiene, cyclooctene, 1,5,9-cyclododecatriene, cyclododecene, dihydrodicyclopentadiene, 1,5-cyclooctadiene, 1,3,5,7-cyclooctatetraene, bicyclo[4.3.0]nona-3,7-diene, bicyclo[4.3.0]nona-3,6(1)-diene, mixtures thereof and the like.

Suitable materials from which adequate molds, for casting the compositions of the present invention, may be prepared include polymers such as, for example, polyethylene, polypropylene, their copolymers and the like, polyurethanes, polysiloxane elastomers, Mylar ®, cured polyepoxides, mixtures thereof and the like.

It is preferred to employ relatively thin wall molds or molds having a low heat capacity or thermal conductivity. Heavy molds made of relatively high thermal conductivity materials such as aluminum, copper, iron or steel and the like may present curing problems, i.e., the reactants may not be readily demolded unless the mold is preheated to about 50°–90° C., especially when casting relatively thin sections. However, high thermal conductivity materials such as copper or aluminum can be employed as thin wall molds without preheating if the thermal capacity of the mold is relatively low compared to the amount of heat liberated in the casting.

The compositions of the present invention are useful as, but not restricted to such uses as, a casting material for preparing bearing surfaces, annular spacers, decorative objects, furniture or furniture components, gears or other machine components, threaded protective plugs and caps, and the like.

The following examples are illustrative of the present invention.

In each of the following examples and comparative experiments, all of the components except the catalyst were blended together and then the catalyst was rapidly blended and poured into a suitable mold. In those instances where an amine initiated polyol was employed, wherein no catalyst is required, all of the components were blended together except the polyisocyanate which was later rapidly blended and the resultant mixtures poured into a suitable mold.

The components and results are given in the following Table.

TABLE I

| Component and Property | Example or Comparative Experiment Designation | | | | |
|---|---|---|---|---|---|
| | Example 1 | Example 2 | Example 3 | Example 4 | Example 5 |
| Polyol, type/grams | A/50 | A/50 | A/50 | A/60 | B/84 |
| Polyisocyanate, type/grams | A/50 | A/50 | A/50 | A/60 | B/160 |
| Modifier, type/grams | A/50 | A/100 | B/50 | C/60 | A/100 |
| Catalyst, type/cc | A/1 | A/1 | B/1 | B/1 | none |
| Mold type | MT[3] | MT | MT | MT | Al[5] |
| Solidification Time[1], sec. | <30 | <60 | 20 | 30 | 50 |
| Demold Time[1], minutes | <3 | <5 | <3 | <3 | 2 |
| Density, g/cc | >1 | >1 | >1 | >1 | >1 |
| Tensile Strength, psi/ kg/cm$^2$ | 6548/ 460.32 | 3098/ 217.79 | 5441/ 382.5 | 4130/ 289.6 | 9506[6]/ 668.27 |
| Elongation, % | 25 | 8 | 12 | 8 | 6 |

TABLE I-continued

| | | | | | |
|---|---|---|---|---|---|
| Barcol Hardness | 85[2] | 60[2] | 85[2] | N.D.[4] | N.D. |
| Remarks | opaque, white solid | | opaque, off-white solid | opaque off-white solid | ½" thick dark brown solid |

| Component and Property | Example or Comparative Experiment Designation: Example 6 | Example 7 | Comparative Experiment A | comparative Experiment B |
|---|---|---|---|---|
| Polyol, type/grams | A/50 | A/50 | A/60 | A/60 |
| Polyisocyanate, type/grams | A/50 | A/50 | A/60 | A/60 |
| Modifier, type/grams | D/50 | E/50 | F/60 | G/60 |
| Catalyst, type/grams | B/1 | B/1 | B/1 | B/1 |
| Mold Type | P.E.[7] | MT[3] | MT | MT |
| Solidification Time[1], seconds | 15 | <30 | N.D.[4] | N.D. |
| Demold Time[1], seconds | 2 | <2 | N.D. | N.D. |
| Density, g/cc | >1 | >1 | N.D. | N.D. |
| Tensile Strength, psi/kg/cm² | N.D. | 6643/467 | N.D. | N.D. |
| Elongation, % | N.D. | 14 | N.D. | N.D. |
| Barcol Hardness | N.D. | 80 – 85[2] | N.D. | N.D. |
| Remarks | | and a clear | separated into 2 phases, an opaque white polymer layer mold a solidifying liquid layer 30 sec. after catalyst addition | within 30 sec. after catalyst addition, there appeared in the opaque mass and the simultaneous rejection (oozing-out of the solidifying-ing mass) of a clear liquid phase |

| Component and Property | Example or Comparative Experiment Designation: Comparative Experiment C | Comparative Experiment D | Example 13 | Example 14 |
|---|---|---|---|---|
| Polyol, type/grams | A/60 | A/60 | C/33.5 | D/23 |
| Polyisocyanate, type/grams | A/60 | A/60 | B/67 | B/67 |
| Modifier, type/grams | H/60 | I/60 | A/35 | A/35 |
| Catalyst, type/grams | B/1 | B/1 | A/0.2 | A/0.2 |
| Mold Type | MT[3] | MT | MT | MT |
| Solidification Time[1], seconds | N.D.[4] | 20 | 15 | 20 |
| Demold Time[1], seconds | N.D. | N.D. | 90 | 170 |
| Density, g/cc | N.D. | 0.38 | >1 | >1 |
| Tensile Strength, psi/kg/cm² | N.D. | N.D. | 6947/488 | 2161/152 |
| Elongation, % | N.D. | N.D. | 12 | 4 |
| Barcol Hardness | N.D. | N.D. | 95[2] | 85[2] |
| Remarks | within 30 sec. after catalyst addition, there appeared in the mold a solidifying opaque mass and the simultaneous rejection (oozing-out of the solidifying mass) of a clear liquid phase | product swelled into a foamlike substance | | |

[1]The time was measured from the instant all of the components were blended together.
[2]Determined on a No. 935 tester
[3]The mold was a Mylar[R] tray
[4]Not Determined
[5]The mold was aluminum about ¼-inches thick preheated to a temperature of about 100° C.
[6]Value obtained after heating the demolded cast sheet at 140° C for 14 hours
[7]The mold was a 450 cc polyethylene beaker POLYOL A — was the reaction product of glycerine with propylene oxide of an OH equivalent weight of about 87.

POLYOL B — was the reaction product of aminoethylethanolamine with propylene oxide having an average OH equivalent weight of about 69–71.

POLYOL C — was dipropylene glycol having an OH equivalent weight of 67.

POLYOL D — was propylene glycol having an equivalent weight of 45.

POLYISOCYANATE A — was an 80/20 mixture of 2,4-/2,6-toluene diisocyanate having an NCO equivalent weight of about 87.

POLYISOCYANATE B — was a polymethylene polyphenylisocyanate having an average NCO functionality of about 2.7 and an average NCO equivalent weight of about of about 134.

MODIFIER A — was dicyclopentadiene having an atmospheric boiling point of about 170° C.

MODIFIER B — was 1,5-cyclooctadiene having an atmospheric boiling point of about 149°–150° C.

MODIFIER C — was cyclooctene, practical grade having a boiling point of about 145°–146° C.

MODIFIER D — was a light hydrocarbon plant residue containing about 50% by weight of dicyclopentadiene having an atmospheric boiling point range as follows:
initial b.p. about 140° C.
midpoint b.p. about 170° C.
endpoint b.p. about 200° C.

MODIFIER E — was a mixture containing 90% dihydrodicyclopentadiene by weight and the remaining 10% being a mixture of tetrahydrocyclopentadienes and dicyclopentadiene, said mixture having an atmospheric boiling point above 150° C.

MODIFIER F — was n-decane having an atmospheric boiling range of about 173°–175° C.

MODIFIER G — was triisobutylene having an atmospheric boiling range of about 174° C.–179° C.

MODIFIER H — was decahydronaphthalene (a saturated cyclic aliphatic hydrocarbon) having an atmospheric boiling point of about 185° C.

MODIFIER I — was cyclohexene having an atmospheric boiling point of about 83° C.

CATALYST A — was stannous octoate, commercially available from M&T Chemicals Inc. as T-9.

CATALYST B — was lead octoate containing 24% lead by weight.

I claim:

1. A solid, rigid, non-cellular polyurethane having a density of at least about 1 g/cc, a percent elongation of less than 100, resulting from the admixture of the components of a polyurethane-forming composition, which can be demolded within 5 minutes after admixture of said components said polyurethane-forming composition comprising
    (A) a polyol or mixture of polyols having a functionality of from 2 to about 8 and an average hydroxyl equivalent weight of from about 30 to less than about 250;
    (B) an organic polyisocyanate;
    (C) as a modifier, a cyclic unsaturated aliphatic hydrocarbon having a boiling point of at least about 140° C.;
    (D) an organo-metallic catalyst for urethane formation;
wherein Components (A) and (B) are present in quantities so as to provide an NCO:OH ratio of from about 0.8:1 to about 2:1; Component (C) is present in quantities of from about 15 to about 50 percent by weight of the sum of Components (A), (B) and (C); Component (D) is present in quantities of from about 0.1 to about 10 percent by weight of the sum of the weights of Components (A), (B) and (C); with the proviso that when Component (A) is an amine initiated polyol, the quantity of Component (D) may be zero and when Component (A) is a difunctional polyol, then the average NCO-functionality of Component (B) is at least about 2.5.

2. A polyurethane of claim 1, wherein Component (A) has an average equivalent weight of from about 75 to about 200; Components (A) and (B) are employed in quantities such that the NCO:OH ratio is from about 0.95:1 to about 1.1:1; and Component (D) when present is employed in quantities of from about 0.1 to about 2 percent.

3. A polyurethane of claim 2 wherein Component (C) is employed in quantities of 20% to 40%.

4. A polyurethane of claim 3 wherein Component (C) is selected from dicyclopentadiene, 1,5-cyclooctadiene, cyclooctene, dihydrodicyclopentadiene and mixtures thereof.

5. A process for producing solid, rigid, non-cellular polyurethane articles having a density of at least 1 g/cc, a percent elongation of less than about 100, and which can be demolded within a period of about 5 minutes without the addition of an external source of heat which process comprises:
    (1) admixing the components of a composition comprising
        (A) a polyol or mixture of polyols having a functionality of from 2 to about 8 and an average hydroxyl equivalent weight of from about 30 to less than about 250;
        (B) an organic polyisocyanate;
        (C) as a modifier, a cyclic unsaturated aliphatic hydrocarbon having a boiling point of at least about 140° C.;
        (D) an organo-metallic catalyst for urethane formation;
    wherein Components (A) and (B) are present in quantities so as to provide an NCO:OH ratio of from about 0.8:1 to about 2:1; Component (C) is present in quantities of from about 15 to about 50 percent by weight of the sum of Components (A), (B) and (C); Component (D) is present in quantities of from about 0.1 to about 10 percent by weight of the sum of the weights of Components (A), (B) and (C); with the proviso that when Component (A) is an amine initiated polyol, the quantity of Component (D) may be zero and when Component (A) is a difunctional polyol, then the average NCO-functionality of Component (B) is as least about 2.5;
    (2) placing the admixed composition into a suitable mold wherein said composition solidifies within less than about 5 minutes to a solid having the aforesaid density and elongation; and
    (3) subsequently demolding the resultant article from the mold.

6. The process of claim 1, wherein Component (A) has an average equivalent weight of from about 75 to about 200; Components (A) and (B) are employed in quantities such that the NCO:OH ratio is from about 0.95:1 to about 1.1:1; and Component (D) when present is employed in quantities of from about 0.1 to about 2 percent.

7. The process of claim 2 wherein Component (C) is employed in quantities of 20% to 40%.

8. The process of claim 3 wherein Component (C) is selected from dicyclopentadiene, 1,5-cyclooctadiene, cyclooctene, dihydrodicyclopentadiene and mixtures thereof.

* * * * *